(12) United States Patent
Wade et al.

(10) Patent No.: US 9,003,897 B2
(45) Date of Patent: Apr. 14, 2015

(54) TEMPERATURE COMPENSATED FORCE SENSOR

(75) Inventors: Richard Wade, Worthington, OH (US);
Lamar Floyd Ricks, Lewis Center, OH (US)

(73) Assignee: Honeywell International Inc., Morristown, NJ (US)

( * ) Notice: Subject to any disclaimer, the term of this patent is extended or adjusted under 35 U.S.C. 154(b) by 345 days.

(21) Appl. No.: 13/468,899

(22) Filed: May 10, 2012

(65) Prior Publication Data

US 2013/0298688 A1 Nov. 14, 2013

(51) Int. Cl.
*G01L 1/22* (2006.01)
*G01L 1/24* (2006.01)
*G01L 1/18* (2006.01)
*G01L 1/26* (2006.01)

(52) U.S. Cl.
CPC ..... *G01L 1/26* (2013.01); *G01L 1/18* (2013.01)

(58) Field of Classification Search
CPC . G01L 19/143; G01L 19/0084; G01L 19/147; G01L 19/0061; G01L 19/0069; G01L 1/18; G01L 9/06
USPC .................. 73/756, 721, 727, 708, 720, 726, 73/862.623, 862.627
See application file for complete search history.

(56) References Cited

U.S. PATENT DOCUMENTS

| | | | |
|---|---|---|---|
| 3,886,799 A | 6/1975 | Billette et al. | |
| 4,008,619 A | 2/1977 | Alcaide et al. | |
| 4,098,133 A | 7/1978 | Frische et al. | |
| 4,155,325 A | 5/1979 | Yu | |
| 4,265,164 A | 5/1981 | Maeda et al. | |
| 4,618,397 A | 10/1986 | Shimizu et al. | |
| 4,645,965 A | 2/1987 | Paganelli | |
| 4,656,454 A * | 4/1987 | Rosenberger | 338/2 |
| 4,817,022 A | 3/1989 | Jornod et al. | |

(Continued)

FOREIGN PATENT DOCUMENTS

| | | |
|---|---|---|
| DE | 69209519 | 10/1996 |
| EP | 0091282 | 10/1983 |

(Continued)

OTHER PUBLICATIONS

Bitko et al., "Improving the MEMS Pressure Sensor," Sensors, pp. 1-12, Jul. 2000.

(Continued)

*Primary Examiner* — Laura Martin
*Assistant Examiner* — Jonathan Dunlap
(74) *Attorney, Agent, or Firm* — Seager Tufte & Wickhem LLC (57) ABSTRACT

A force sensor may include a housing having a cavity enclosing a sense die, an actuating element and an elastomeric seal. The sense die may have a force sensing element for sensing a force applied to a surface of the sense die, and a temperature compensation circuit. The temperature compensation circuit may be located on the surface of the sense die and may be configured to at least partially compensate for the temperature sensitivity of the force sensing element. The actuating element may extend outside the housing and be used to transfer a force applied externally from the housing to the sense die. The elastomeric seal may include one or more conductive elements separated from the edge of the elastomeric seal by an insulating elastomeric material.

20 Claims, 10 Drawing Sheets

(56) References Cited

U.S. PATENT DOCUMENTS

| | | | |
|---|---|---|---|
| 4,945,762 A | 8/1990 | Adamic, Jr. | |
| 5,088,329 A | 2/1992 | Sahagen | |
| 5,144,843 A | 9/1992 | Tamura et al. | |
| 5,155,061 A | 10/1992 | O'Connor et al. | |
| 5,165,289 A | 11/1992 | Tilmans | |
| 5,184,107 A | 2/1993 | Maurer | |
| 5,187,985 A | 2/1993 | Nelson | |
| 5,223,776 A | 6/1993 | Radke et al. | |
| 5,257,547 A | 11/1993 | Boyer | |
| 5,303,593 A | 4/1994 | Kremidas | |
| 5,333,504 A | 8/1994 | Lutz et al. | |
| 5,351,550 A * | 10/1994 | Maurer | 73/727 |
| 5,353,003 A * | 10/1994 | Maurer | 338/47 |
| 5,357,808 A | 10/1994 | Fung et al. | |
| 5,438,875 A | 8/1995 | Fung et al. | |
| 5,453,628 A | 9/1995 | Hartsell et al. | |
| 5,459,351 A | 10/1995 | Bender | |
| 5,499,041 A | 3/1996 | Brandenburg et al. | |
| 5,528,452 A | 6/1996 | Ko | |
| 5,535,135 A | 7/1996 | Bush et al. | |
| 5,551,304 A | 9/1996 | Baskett | |
| 5,583,295 A | 12/1996 | Nagase et al. | |
| 5,585,311 A | 12/1996 | Ko | |
| 5,587,601 A | 12/1996 | Kurtz | |
| 5,661,245 A | 8/1997 | Svoboda et al. | |
| 5,744,726 A | 4/1998 | Maurer | |
| 5,747,705 A | 5/1998 | Herb et al. | |
| 5,760,313 A | 6/1998 | Guentner et al. | |
| 5,770,883 A | 6/1998 | Mizuno et al. | |
| 5,808,210 A | 9/1998 | Herb et al. | |
| 5,870,482 A | 2/1999 | Loeppert et al. | |
| 5,996,419 A | 12/1999 | Sokn | |
| 5,999,084 A | 12/1999 | Armstrong | |
| 6,098,464 A | 8/2000 | Avisse et al. | |
| 6,112,598 A | 9/2000 | Tenerz et al. | |
| 6,117,292 A * | 9/2000 | Ahmad | 204/416 |
| 6,150,681 A | 11/2000 | Allen | |
| 6,167,763 B1 | 1/2001 | Tenerz et al. | |
| 6,229,190 B1 | 5/2001 | Bryzek et al. | |
| 6,255,728 B1 | 7/2001 | Nasiri et al. | |
| 6,263,740 B1 | 7/2001 | Sridhar et al. | |
| 6,311,561 B1 | 11/2001 | Bang et al. | |
| 6,343,991 B1 | 2/2002 | Armstrong | |
| 6,351,996 B1 | 3/2002 | Nasiri et al. | |
| 6,445,053 B1 | 9/2002 | Cho | |
| 6,452,427 B1 | 9/2002 | Ko et al. | |
| 6,481,286 B1 | 11/2002 | Bernstein et al. | |
| 6,489,668 B1 | 12/2002 | Oda et al. | |
| 6,497,583 B1 | 12/2002 | Weiss et al. | |
| 6,528,340 B2 | 3/2003 | Haji-Sheikh et al. | |
| 6,601,455 B2 | 8/2003 | Kurtz et al. | |
| 6,615,668 B2 | 9/2003 | Toyoda et al. | |
| 6,621,138 B1 | 9/2003 | Alter | |
| 6,705,166 B2 | 3/2004 | Leonardson | |
| 6,712,778 B1 | 3/2004 | Jeffcoat et al. | |
| 6,736,015 B1 | 5/2004 | Repperberger et al. | |
| 6,778,916 B2 | 8/2004 | Lee | |
| 6,813,956 B2 | 11/2004 | Kurtz et al. | |
| 6,874,377 B2 | 4/2005 | Karbassi et al. | |
| 6,907,789 B2 | 6/2005 | Bodin | |
| 6,923,069 B1 | 8/2005 | Stewart | |
| 6,945,118 B2 | 9/2005 | Maitland, Jr. et al. | |
| 6,958,523 B2 | 10/2005 | Babcock et al. | |
| 7,024,937 B2 | 4/2006 | James | |
| 7,099,652 B2 | 8/2006 | Brown et al. | |
| 7,162,927 B1 * | 1/2007 | Selvan et al. | 73/753 |
| 7,218,093 B2 | 5/2007 | Cirkel et al. | |
| 7,287,432 B2 | 10/2007 | Schnaare et al. | |
| 7,290,453 B2 | 11/2007 | Brosh | |
| 7,343,812 B2 * | 3/2008 | Stewart et al. | 73/756 |
| 7,360,438 B2 | 4/2008 | Gaines | |
| 7,404,338 B2 | 7/2008 | Hierold et al. | |
| 7,462,919 B2 | 12/2008 | Engling et al. | |
| 7,493,823 B2 | 2/2009 | Stewart et al. | |
| 7,503,221 B2 | 3/2009 | Wade | |
| 7,554,167 B2 | 6/2009 | Vaganov | |
| 7,591,186 B1 * | 9/2009 | Boyer | 73/756 |
| 7,707,899 B2 | 5/2010 | Sakurai et al. | |
| 7,714,694 B2 * | 5/2010 | Landsberger et al. | 338/9 |
| 7,726,197 B2 | 6/2010 | Selvan et al. | |
| 7,775,126 B2 | 8/2010 | Eckhardt et al. | |
| 7,775,127 B2 | 8/2010 | Wade | |
| 7,791,151 B2 | 9/2010 | Vaganov et al. | |
| 7,880,247 B2 | 2/2011 | Vaganov et al. | |
| 7,918,136 B2 | 4/2011 | Muchow et al. | |
| 8,004,052 B2 | 8/2011 | Vaganov | |
| 8,024,978 B2 | 9/2011 | Khemet et al. | |
| 8,091,436 B2 | 1/2012 | Eckhardt et al. | |
| 8,183,077 B2 | 5/2012 | Vaganov et al. | |
| 8,186,226 B2 | 5/2012 | Ricks | |
| 2007/0171589 A1 | 7/2007 | Otake | |
| 2007/0238215 A1 | 10/2007 | Stewart et al. | |
| 2007/0251328 A1 | 11/2007 | Selvan et al. | |
| 2009/0211362 A1 | 8/2009 | Krog et al. | |
| 2009/0263062 A1 | 10/2009 | Smith et al. | |
| 2011/0000318 A1 | 1/2011 | Bradley et al. | |
| 2011/0259111 A1 | 10/2011 | Ohsato | |
| 2012/0125114 A1 | 5/2012 | Stewart et al. | |
| 2012/0152037 A1 | 6/2012 | Wade | |

FOREIGN PATENT DOCUMENTS

| | | |
|---|---|---|
| EP | 0354366 | 11/1992 |
| EP | 1519173 | 3/2005 |
| EP | 1348110 | 5/2005 |
| EP | 2110569 | 10/2009 |
| JP | 57115873 | 7/1982 |
| JP | 63065679 | 3/1988 |
| JP | 63196080 | 8/1988 |
| JP | 63215929 | 9/1988 |
| JP | 2004012406 | 1/2004 |
| JP | 2004304052 | 10/2004 |
| WO | 9919704 | 4/1994 |
| WO | 9527323 | 10/1995 |
| WO | 0135066 | 5/2001 |
| WO | 0165232 | 9/2001 |
| WO | 02103369 | 12/2002 |
| WO | 2005038422 | 4/2005 |
| WO | 2006084971 | 8/2006 |
| WO | 2007127738 | 11/2007 |
| WO | 2010048040 | 4/2010 |
| WO | 2012094778 | 7/2012 |

OTHER PUBLICATIONS

U.S. Appl. No. 13/429,280, filed Mar. 23, 2012.

Silicon Microstructures Inc., "Low Pressure Transducer Fully Temperature Compensated and Calibrated Dual In-Line Package," SM5651-SM5652 Low Pressure Constant Current/Voltage Dip, 2 pages, 2001-2002.

Warren Schultz, "Interfacing Semiconductor Pressure Sensors to Microcomputers," Freescale Semiconductor, AN1318 Rev 2, 12 pages, May 2005.

Warren Schultz, "Interfacing Semiconductor Pressure Sensors to Microcomputers," Motorola, AN1318, 10 pages, 1997.

Zentrum Mikroelektronik Dresden AG, "ZMD31050/ZMD31150 Advanced Sensor Signal Conditioner," Application Notes, Electronic Offset Compensation, 4 pages, Apr. 13, 2010.

Zentrum Mikroelektronik Dresden AG, "ZSC31050 Advanced Differential Sensor Signal Conditioner," Functional Description, 50 pages, Jul. 29, 2010.

http://www.digikey.com/catalog/en/partgroup/fsg-series-force-sensor/23592?print=1, "FSG Series Force Sensor", Sensing and Control, 1 page, printed Aug. 1, 2012.

http://www.gesilicones.com/siliconesweb/am1/en/documentsdatasheets;1838.html, "Momentive Performance Materials," 5 pages, printed Nov. 19, 2008.

Honeywell, "Airflow, Force, and Pressure Sensors, Product Range Guide," 20 pages, Nov. 2010.

Honeywell, "Force Sensors Line Guide," 4 pages, Jun. 2009.

Honeywell, "Pressure, Airflow, Force", Sensing and Control, pp. 1-10, 2003.

(56) References Cited

OTHER PUBLICATIONS

Honeywell, "Pressure Sensors FS01/FS03 Force Sensors," 4 pages, 2003.
Honeywell, "TruStability Silicon Pressure Sensors: HSC Series-High Accuracy," 12 pages, Jul. 2010.
Honeywell, "TruStability Silicon Pressure Sensors: SSC Series-Standard Accuracy," 12 pages, Jul. 2010.
Honeywell, "Force Sensors: FSS Low Profile Force Sensors," Honeywell International Inc., 4 pages, 2003.
Burri, "Calibration-Free Pressure Sensor System," Senior System Engineer Geneva Switzerland, Rev 2, 8 pages, Oct. 2004, AN 1097.
Schultz, "Interfacing Semiconductor Pressure Sensors to Microcomputers," Discrete Applications Engineering, Rev 2, 12 pages, May 2005, AN 1318.
Honeywell, "Pressure and Force Sensors: Output Signal Adjustment and Temperature Compensation for 24PC and FS Series—Note #1," Micro Switch Sensing and Control, 3 pages, Downloaded Jan. 27, 2012.
Honeywell, "Force Sensors Line Guide," Honeywell Sensing and Control, 4 pages, Jul. 2009, 608151-3-EN IL50 GLO.
Measurement Specialties, "MS4415," Component Distributors Inc., 3 pages, Downloaded Jan. 25, 2012.
R. Colin Johnson, "MEMS enables electrically trimmable passive resistor," EE Times News and Analysis, 2 Pages, Printed Jan. 25, 2012, http://www.eetimes.com/electronics-news/4076093/MEMS-enables-electrically-trimmable . . . .
Dr. Les M. Landsberger, "Simplifying Circuit Calibration With Electrically-Adjustable Resistors," Microbridge, 10 pages, Mar. 2007.

* cited by examiner

TEMPERATURE COMPENSATED FORCE SENSOR

TECHNICAL FIELD

The present disclosure relates generally to sensors, and more particularly, to force sensors for sensing a force applied to the sensors.

BACKGROUND

Force sensors are often used to sense an external force applied to the sensors and provide an output signal representative of the applied force. Such sensors can be used in a wide variety of applications including medical. Example medical applications include use in medical equipment in control of, for example, kidney dialysis machines, drug delivery systems, hematology equipment, infusion pumps, entrial feeders, ventilation equipment, as well as other medical equipment. Force sensors are also commonly used in non-medical applications, such as industrial applications, consumer applications, military applications, as well many other applications.

SUMMARY

The present disclosure relates to force sensors for sensing an applied force. In one illustrative embodiment, a force sensor may include a housing having a cavity where a force sense die, an actuating element and an elastomeric seal may be located. The sense die may have one or more force sensing elements, such as one or more piezoresistive elements, located on a diaphragm. The sense die may also include a temperature compensation circuit. The temperature compensation circuit may include one or more adjustable or trimmable resistor or other adjustable elements that can be adjusted during or after assembly to at least partially compensate the force sensor for temperature induced effects. In some instances, the sense die may have two or more piezoresistive elements connected in a Wheatstone bridge configuration, and the temperature compensation circuit may have a first trimmable resistor in series with a first power input of the Wheatstone bridge and a second trimmable resistor in series with a second power input of the Wheatstone bridge. This is just one example.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION

The disclosure may be more completely understood in consideration of the following description of various illustrative embodiments of the disclosure in connection with the accompanying drawings, in which.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described herein. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to be illustrative in nature.

Figure 1A:
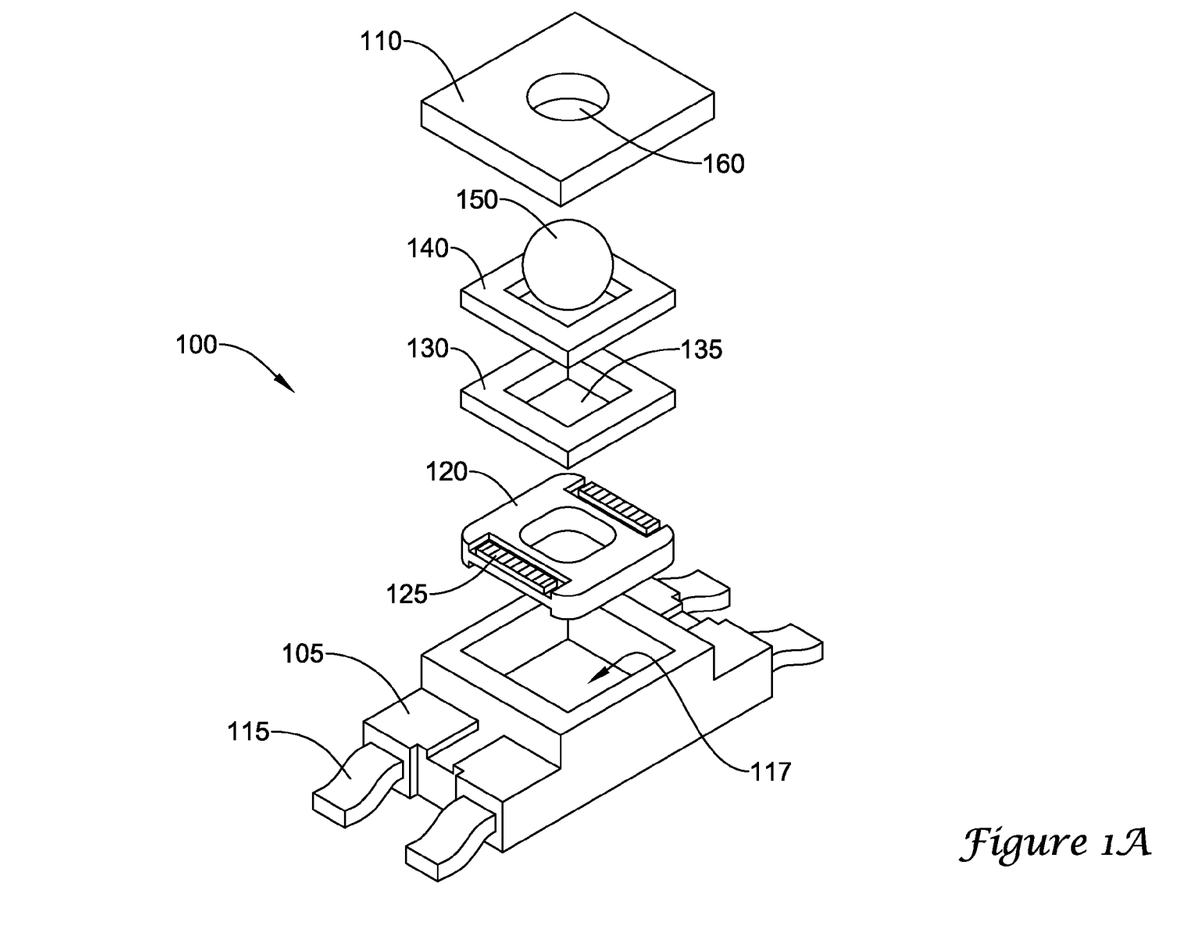
FIGS. 1A and 1B show an exploded view and a package view, respectively, of an illustrative temperature compensated force sensor assembly.
Figure 1B:
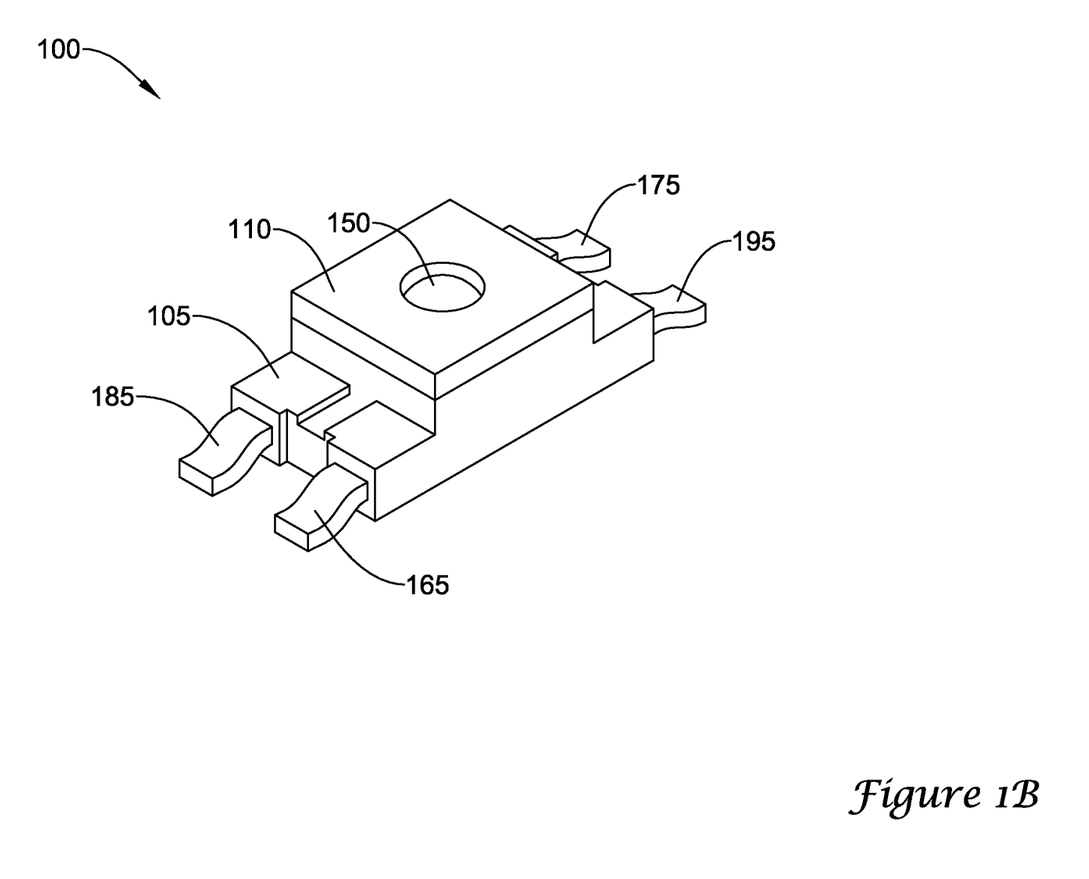

FIGS. 1A and 1B show an exploded view and a package view, respectively, of an illustrative temperature compensated force sensor assembly 100. As shown in FIG. 1A, the illustrative force sensor 100 includes a housing having a base 105, a cover 110 and one or more electrical connections 115. In some cases, the base 105 and the cover 110 may define a cavity 117 that may contain an elastomeric seal 120 having one or more conductive regions 125, a sense die 130, a second elastomeric seal 140, and an actuating element 150. In some cases, the cover 110 may include an opening 160 to gain access to the actuating element 150.

During assembly, the elastomeric seal 120 may be inserted into the cavity 117 so that the conductive regions 125 provide electrical contact to the one or more electrical connections 115 of the housing. The sense die 130 may be inserted above the elastomeric seal 120 such that an electrical connection may be made between one or more pads on a first surface of the sense die 130 to respective conductive regions 125 of the elastomeric seal 120. In some cases, the first surface may be oriented down into the cavity 117, such that a second surface of the sense die 130 is oriented towards the cover 110. The second surface may include a cavity and/or depression in the sense die 130 that may help define a diaphragm 135 of the sense die 130. In some cases, the diaphragm 135 may include one or more force sensing elements, such as the illustrated in FIG. 5A-5C. The second elastomeric seal 140 may be inserted above the sense die 130. The elastomeric seals 120, 140 may be used to form an environmental seal which may help protect electrical components and/or electrical connections of the sense die 130 and/or housing from contaminants and/or other fluid or particulate media.

The actuating element 150 may be placed into an opening of the second elastomeric seal 140 above the cavity on the second side of the sense die 130. The actuating element 150 may be configured to be operably coupled to the sense die 130 to transfer a force to the diaphragm 135 of the sense die 130 from a source external to the force sensor 100. In some embodiments, a component stack including the elastomeric seal 120, the sense die 130, the second elastomeric seal 140 and the actuating element 150, when placed in the cavity, may extend above a top surface of the base 105 (e.g., extending out of the cavity 117 in the base 105) or may lie wholly within the cavity 117. When the component stack extends out of the cavity 117, a pressure may be applied to the cover 110 during assembly to form the force sensor 100. In such cases, the pressure applied during the assembly process to apply the cover 110 to the base 105 may help compress one or more of the elastomeric seals 120, 140. The force used to compress the elastomeric seals 120, 140 may also apply a preloaded force to the actuating element 150 against the diaphragm 135 of the sense die 130. In some cases, the force used to attach the cover and/or the preloaded force on the actuating element may be selected based at least in part on the size and/or composition of the elastomeric seals 120, 140 as well as other part dimensions and tolerances. In some cases, the actuating element 150 may be inserted through the opening 160 in the cover after the cover 110 has been connected to the base 105.

In some cases, the base 105 and/or the cover 110 may form a housing having a surface mount technology package (SMT). In other cases, the base and/or the cover 110 may form a housing having another integrated circuit packaging type, such as a small-outline integrated circuit (SOIC) package, a plastic leaded chip carrier (PLCC) package, a Single In-Line Package (SIP), Dual In-Line Package (DIP), or any other suitable package type. The base 105 and/or cover may be formed using any suitable material including, for example, plastic, polyamide, ceramic, metal or other suitable material. As shown in FIGS. 1A and 1B, the base 105 may include one or more electrical connections 115. These electrical connections may include connections for a power supply, ground, and one or more output signals such as a single ended or a differential output signal. More generally, the electrical connections 115 may be used for transmitting and/or receiving power and/or other signals to/from the sense die 130. In some cases, the base may include leads 165, 175, 185 and 195 for connecting a power supply, such as a power supply connection 165 (e.g., Vs), and a ground connection 175, and two differential sensor output signals, such as $V_{O+}$ 185 and/or $V_{O-}$ 195. In some cases, the leads 165, 175, 185 and 195 may be formed of metal, but may also be made of any suitable conductive material, such as a conductive polymer.

As discussed above, the housing components including the base 105 and the cover 110 may define a cavity 117 within the housing. The cavity 117 may be sized to house the sense die 130, the elastomeric seals 120, 140 and at least part of the actuating element 150. In one embodiment, the cavity 117 may be dimensioned within suitable tolerances to allow for hand assembly of the force sensor 100. In other cases, the dimensional tolerances of the cavity 117 may be finer because the force sensor 100 may be assembled in another manner, such as an automated process. In some embodiments, the cover 110 may include the opening 160 to provide access between the exterior of the force sensor 100 and the cavity 117. In some cases, the actuating element 150 may extend from the diaphragm 135 and through the opening 160 so that at least a portion of the actuating element 150 is exposed above the exterior surface of the cover 110. In other cases, the opening 160 may be formed such that an external member may extend through the opening 160 to contact the actuating element 150 inside the cavity 117.

The actuating element 150 may be operably coupled to (e.g. contacting) the sense die 130 so that the actuating element 150 can transfer a force from a source external to the force sensor 100 to the sense die 130. A first portion of the actuating element 150 may extend through the opening 160 of the housing to receive the externally applied force. A second portion of the actuating element 150 may engage a contact area of the sense die 130 (e.g., a contact region of the diaphragm 135 of the sense die 130) so that the force sensing elements may produce a signal that is related (e.g. proportional) to the externally applied force. In some cases, the force applied to the sense die 130 is substantially non-uniform over the surface area of the diaphragm 135. For example, the contact area may have an area that is substantially less than the total area of the diaphragm 135. In some cases, the center of the contact area (e.g., the area of contact between the actuating element 150 and the sense die 130) may be located away from, or not centered relative to, the precise center of the diaphragm 135. In some cases, the actuating element 150 may be configured to provide an externally applied force to at least a portion of the diaphragm 135 by moving along an axis of movement (e.g., perpendicular to the sense die). In some cases, the axis of movement of the actuating element 150 may be offset from, and not coaxial with, a line extending through the center of the diaphragm.

In some cases, the actuating element 150 may include a spherical object (e.g., as shown in FIGS. 1A and 1B), an extender, a button, a pin or any other actuating element shape and/or combination of shapes as desired. In some cases, the actuating element 150 may be shaped to have a first end and a second end, and a substantially cylindrical side wall extending between the first end and the second end. The first end and/or second end may be substantially flat, substantially semi-spherical, curved, or any other suitable shape. It may be appreciated that other types of actuating elements may be utilized such as, for example, a slidable mounted plunger or shaft, a point of contact type component other than spherical or semi-spherical objects, a 'T' shaped transfer mechanism, or any other suitable actuating element.

In some cases, the portion of the actuating element 150 that is configured to contact the diaphragm 135 of the sense die 130 may be substantially spherical, substantially flat, curved, or have any another suitable shape. The actuating element 150 may be made of any material. For example, the actuating element 150 may include metal such as stainless steel, plastic, ceramic, and/or other suitable material or material combination. In some cases, the actuating element 150 may include a stainless steel ball bearing. It is contemplated, however, that other generally spherical and other shaped elements may be used as or as part of the actuating element 150, if desired, including polymer based objects of any suitable shape.

Figure 2A:
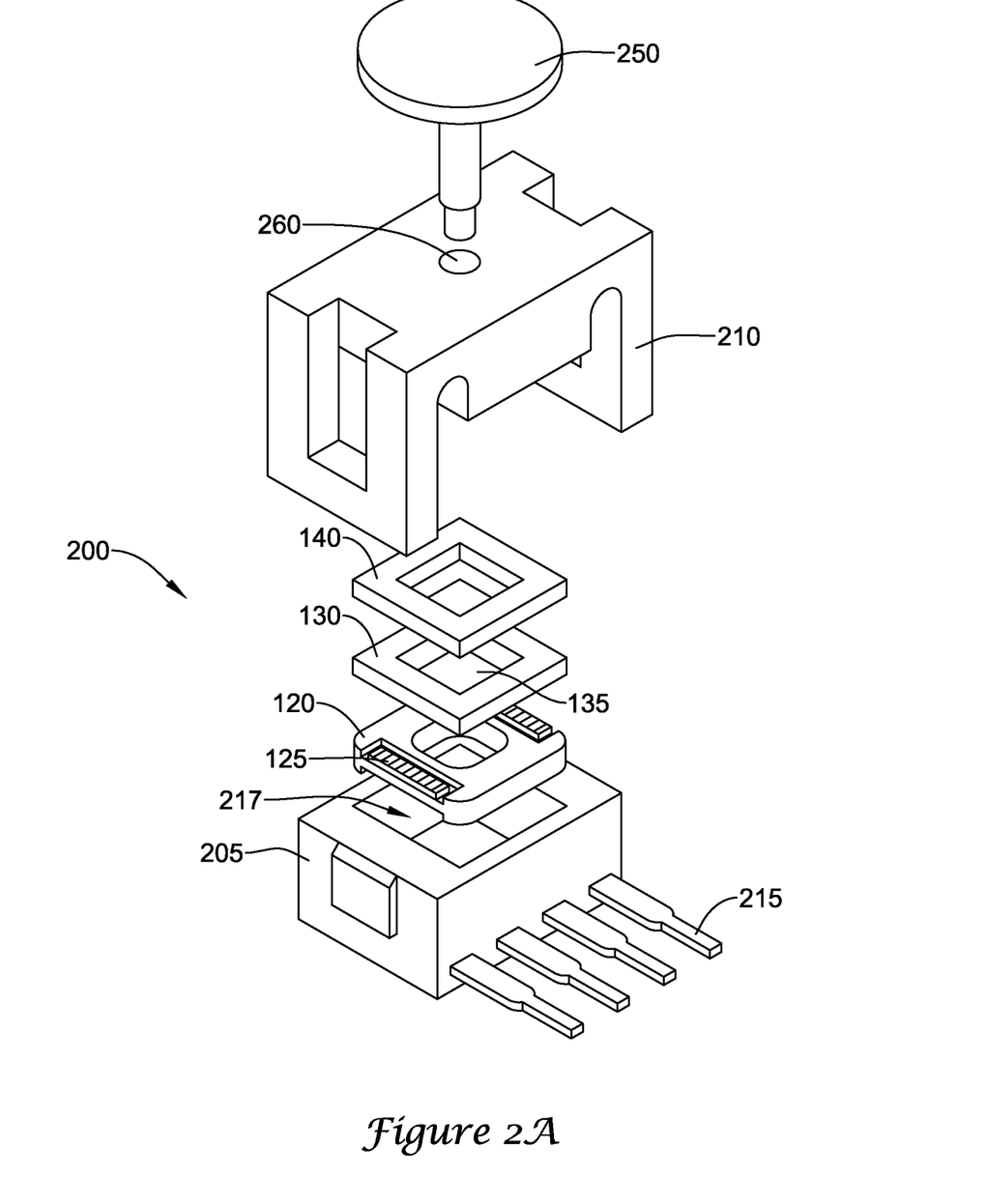
FIGS. 2A and 2B show an exploded view and a package view, respectively, of an illustrative temperature compensated force sensor assembly.
Figure 2B:
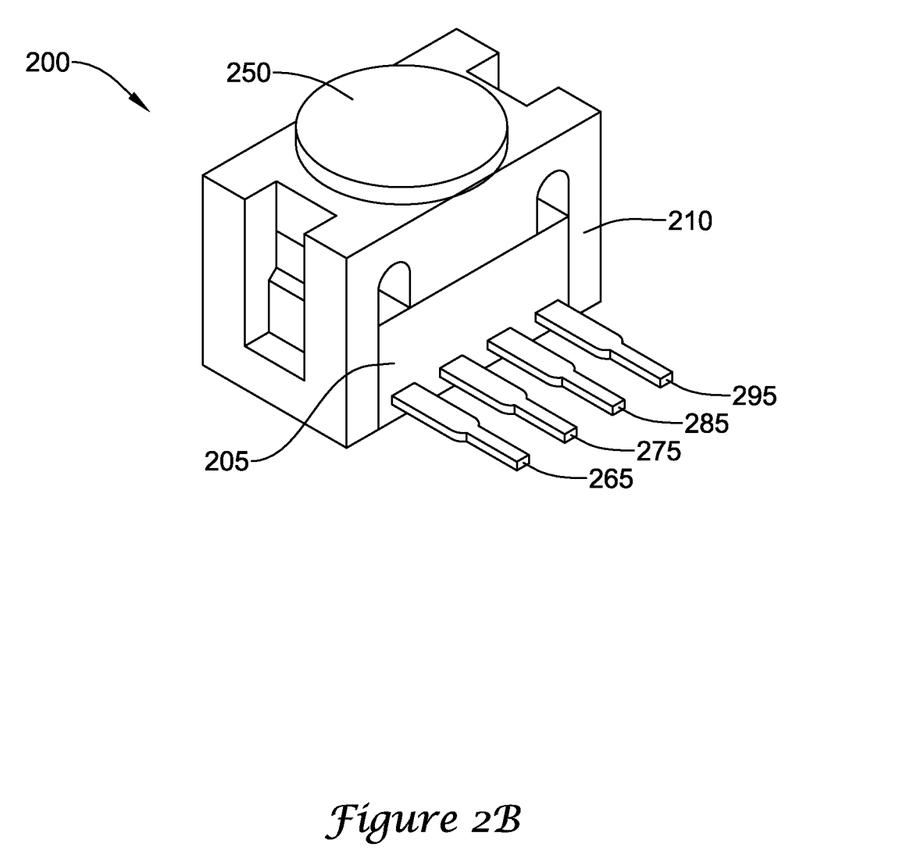

FIGS. 2A and 2B show an exploded view and a package view, respectively, of another illustrative temperature compensated force sensor assembly 200. As shown in FIG. 2A, the illustrative force sensor 200 includes a housing having a base 205 and a cover 210 and one or more leads 215. In some cases, the base 205 and the cover 210 may define a cavity 217 to contain an elastomeric seal 120 having one or more conductive regions 125, a sense die 130, a second elastomeric seal 140, and an actuating element 250. As shown, any one of the base 205, the cover 210, the elastomeric seal 120, the sense die 130, the second elastomeric seal 140 and/or the actuating element may be similar in shape and/or function to the corresponding features described above. In FIG. 2A and 2B, the actuating element 250 has a button shape, with an actuating shaft extending through hole 260 in the cover 210 to engage the diaphragm 135 of the sense die 130. The cover 210 is configured to snap over and form an interface fit with the base 205. In some cases, the actuating element 250 may be removable.

Figure 3A:
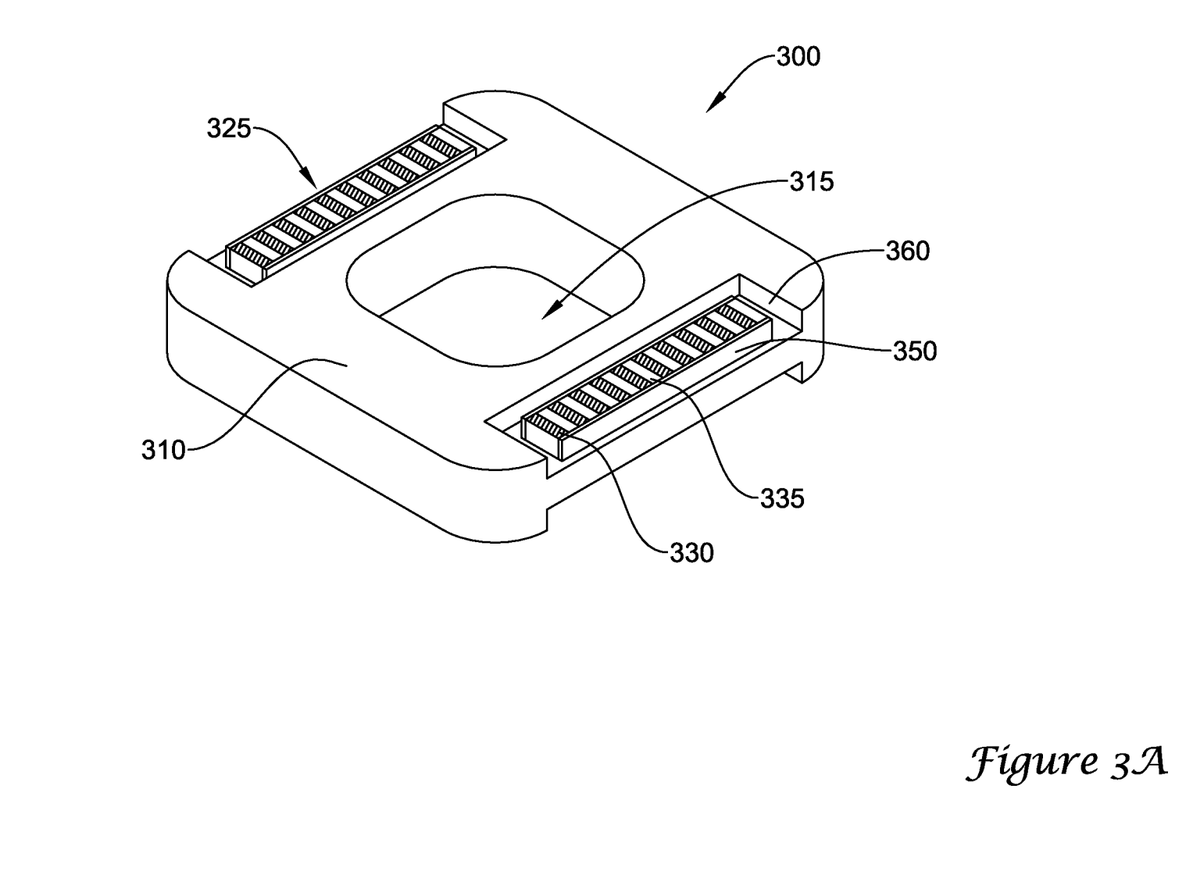
FIG. 3A is a schematic perspective view of an elastomeric seal having at least two conductive elements separated by an insulating element of FIGS. 1A, 1B, 2A and 2B.

FIG. 3A is a schematic perspective view of an elastomeric seal 300, which may be used for elastomeric seal 120 of FIGS.

1A and 2B. The elastomeric seal 300 has at least two conductive elements separated by an insulating elastomeric material. In the example shown, the elastomeric seal 300 may include a non-conductive elastomeric body 310 surrounding an aperture 315. The elastomeric seal 300 may include two or more conductive regions 325, which may include two or more conductive elements 330 separated by an insulating elastomeric element 335.

In one example, the elastomeric seal 300 may be generally rectangular in shape, as illustrated, but this is not necessary. If generally rectangular, non-conductive elastomeric body 310 may further be generally square in shape, but again, this is not required. In some instances, elastomeric seal 300 may include an aperture 315 that extends completely through the elastomeric body 310 from a first side to the opposing second side. When provided, the aperture 315 may have any suitable shape including generally rectangular, triangular, hexagonal, circular, oval, or any other suitable shape, as desired. In some cases, the aperture 315 may be of a similar size to encompass the diaphragm 135 of the sense die 130, but this is not required.

In the illustrative embodiment, the conductive regions 325 may include two or more conductive elements 330 separated by one or more insulating elastomeric elements 335 adjacent to one or more support members 350. In an example, the elastomeric seal 300 may be formed from two or more elastomeric substances. For example, the elastomeric body and/or the support members 350 may be formed from a non-conductive elastomeric substance, the conductive elements 330 may be formed from a conductive elastomeric substance and the insulating elements may be formed from an insulating elastomeric substance. In some cases, each of the elastomeric body 310, the support members 350, the conductive elements 330 and/or the insulating elastomeric elements 335 may be formed of a substance of a similar hardness level or differing harness levels. In some cases, the conductive elements 330 may be substantially insulating when in an uncompressed state, and substantially conducting when in a compressed state, but this is not required.

In some embodiments, the support members 350 may be formed from a harder elastomeric substance than the elastomeric body 310, such that the conductive regions 325 are stiffer than the rest of the elastomeric seal 300. In some cases, the conductive regions 325 may be shaped such that the top and bottom surface of the conductive elements 330, insulating elastomeric elements 335 and/or the support members 350 rise slightly above or below the rest of the elastomeric seal 300. In some embodiments, the conductive regions may be generally rectangular or any other suitable shape. In some cases, a channel 360 may be formed into the surface of the elastomeric body 310 around the conductive elements, the insulating elements and the support members 350. In some examples, the elastomeric body 310 may include a channel 360 around each of the conductive elements, the insulating elements and the support members 350 on both the top surface of the elastomeric body 310 and/or the bottom surface of the elastomeric body 310. In some cases, the channels allow the elastomeric body 310 to primarily flex within the channel 360 when the elastomeric body is under a force received from a the actuating element 150 through the sense die 130, so that the conductive elements 330 remain in a similar position both before and after a force is applied, which may help maintain a seal between the elastomeric body 310 and the sense die 130.

As shown in the illustrative embodiment of FIGS. 1A and 2A, the elastomeric seal 120 may not only provide conductive paths between electrically conductive pads on the sense die 130 to electrical connections 115 of the base 105 in a relatively compliant and space efficient way, but may also help to provide a fluid tight seal between the sense die 130 and the base 105. That is, in some instances, the elastomeric seal 120 may be compressed between the sense die 130 and the base 105 to help provide a seal therebetween.

The elastomeric seal 140 of FIG. 1 may be substantially formed from an electrically insulating elastomeric material and may be used primarily to form a seal between the cover 110 and the sense die 130. In some instances, the base 105 and the cover 110 may be permanently or temporarily attached to help maintain a compression of the elastomeric seal 120 and/or elastomeric seal 140, which may help maintain the seal.

Figure 4:
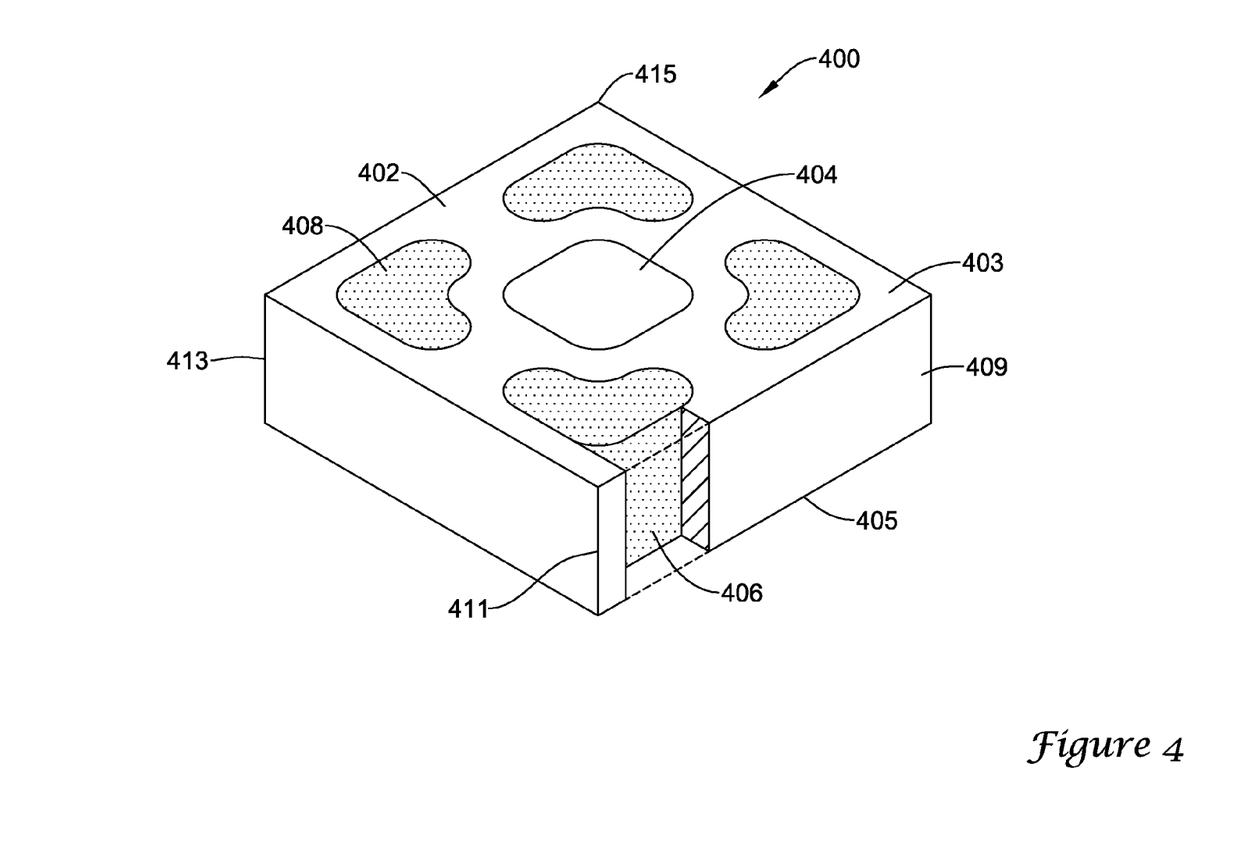
FIG. 4 is a schematic isometric view of an illustrative elastomeric seal with conductive regions.

In some cases, a non-uniform or off-center force applied to the diaphragm 135 of the sense die 130 may cause the sense die 130 and/or the elastomeric seals 120 and 140 to move within the cavity 117. When a conductive element extends to an edge of the elastomeric seal 120, the conductive element may contact an electrical ground connection at or near the edge of the sense die 130, causing a short circuit. In some cases, a ground (or power) connection forms a continuous path around the edge of the sense die. In other cases, a ground (or power) connection may form a discontinuous path around the edge of the sense die 130. The resulting short circuit may short and/or damage one or more electrical components on the sense die 130, such as a temperature compensation circuit. In some cases, the shape, configuration and/or location of the conductive regions 325 within an insulating material as shown in FIGS. 3A and 4, may help protect the sense die 130 from short circuit damage between a conductor and a ground (or power) connection at or near the edge of the sense die 130. For example, the shape of the conductive regions may not allow for physical contact between an electrical connection of the sense die 130 and/or the base 105 and a ground (or power) plane of the sense die 130, when the elastomeric seal 120 shifts slightly within the cavity 117 while a non-uniform or off-center force is applied to the diaphragm 135 of the sense die 130. In some cases, the conductive regions of the elastomeric seals 120, 300 and 400 may be spaced inward from an outer peripheral edge of the elastomeric seals.

Figure 3B:
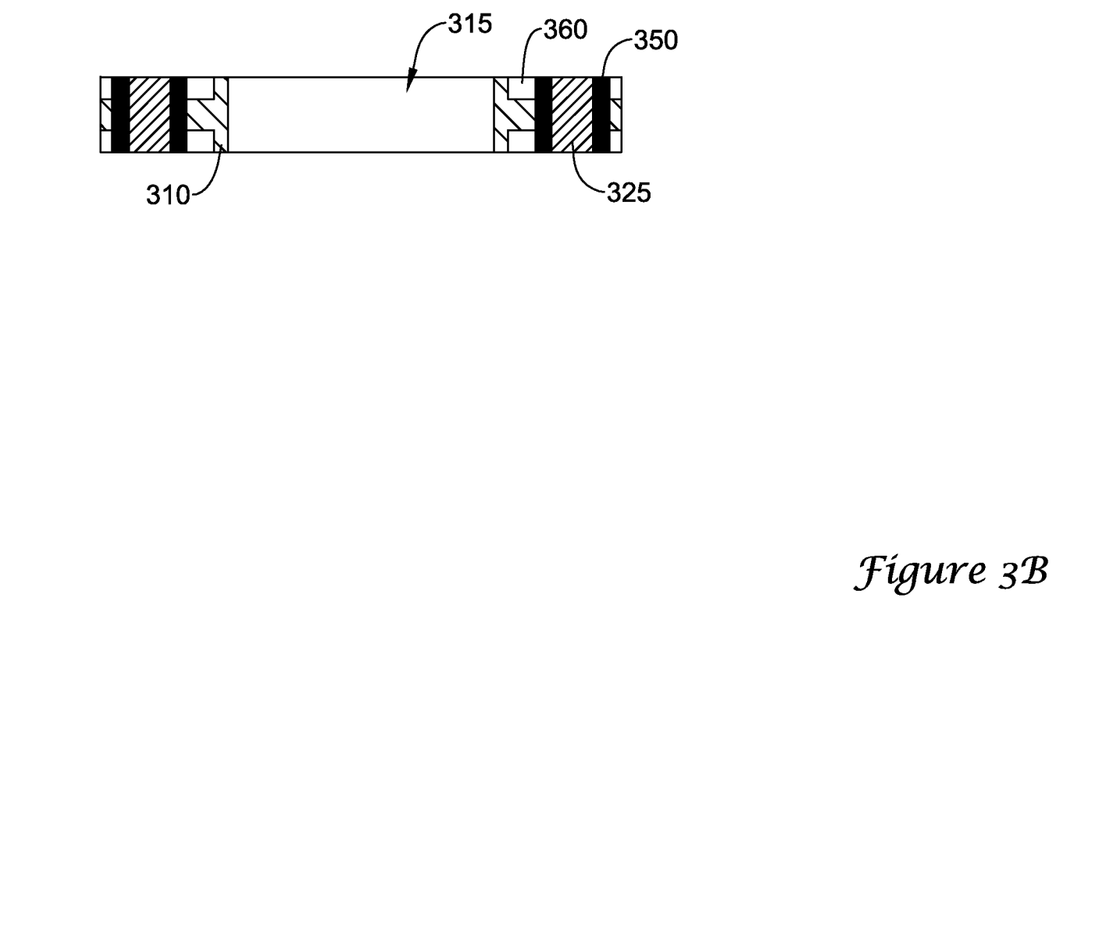
FIG. 3B is a is a schematic cross-sectional view of an elastomeric seal having at least two conductive elements separated by an insulating element of FIG. 3A.

FIG. 3B is a schematic cross-sectional view of the elastomeric seal 300 of FIG. 3A. As discussed above, the elastomeric seal 300 may include the elastomeric body 310 having an aperture 315 formed substantially in the center of the elastomeric body 310. In some cases, the elastomeric body may include two or more conductive regions 325 formed, for example, of alternating sections of a conductive elastomeric substance and an insulating elastomeric substance (stacked into the page). The elastomeric body 310 may include a channel 360 extending around the conductive regions 325. In some examples, the conductive regions 325 may include support members 350 that may be located on one or more sides of the alternating conductive element/insulating element structure.

FIG. 4 is a schematic isometric view of another illustrative elastomeric seal that includes conductive regions. The illustrative elastomeric seal 400 may include a non-conductive elastomeric body 402 having a first major side 403, an opposing second major side 405, and four corners 409, 411, 413 and 415. In some instances, non-conductive elastomeric body 402 may be generally rectangular in shape, as illustrated, but this is not necessary. If generally rectangular, non-conductive elastomeric body 402 may further be generally square in shape, but again, this is not required. In some instances, elastomeric seal 400 may include an aperture 404 that extends completely through the elastomeric body 402 from the first major side 403 to the opposing second major side 405. When provided, the aperture 404 may have any suitable shape including generally rectangular, triangular, hexagonal, circular, oval, or any other suitable shape, as desired. An illustrative elastomeric seal, which is not meant to be limiting in any way, is disclosed in the international application under the Patent Cooperation Treaty: PCT Application No. WO 2012/094778, entitled "ELASTOMERIC CONNECTOR" the entirety of which is incorporated herein by reference for all purposes.

The illustrative elastomeric seal 400 shown in FIG. 4 may include one or more electrically conductive regions or paths, such as path 406, between its top 403 and bottom 405 major sides (top and bottom are merely stated in reference to the illustrated orientation of the connector in FIG. 4 and do not limit the orientation of the connector in actual use). Elastomeric seal 400 of FIG. 4 is illustrated with four conductive paths, each having a contact region 408 on the top major side 403 adjacent one of the four corners. Each of the contact regions 408 may be spaced from the other contact regions and electrically insulated from each of the other contact regions by the non-conductive elastomeric body 402. Each of the conductive paths 406 may conduct electrically from a contact region 408 on the top 403 major side to a corresponding contact region (not seen in the view of FIG. 4) on the bottom 405 major side of the elastomeric body 402. Corresponding contact regions on opposing major sides 403 and 405 of the elastomeric seal 400 may have essentially the same or similar shapes, or they may have different shapes, depending on the application.

Figure 5A:
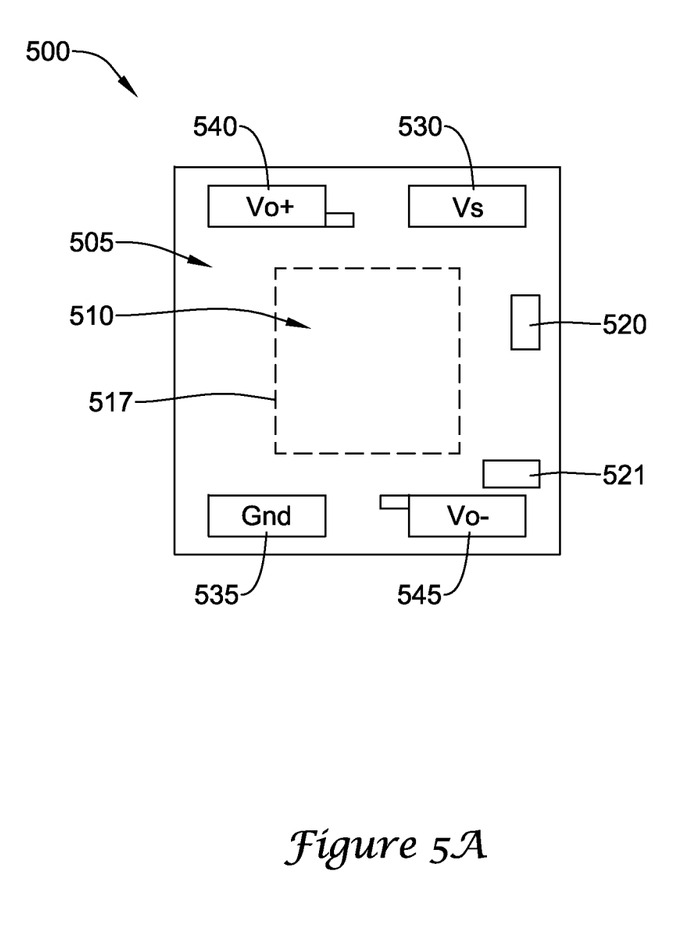
FIG. 5A is a schematic top-side view of an illustrative sense die that may be used with the illustrative force sensors of FIGS. 1A, 1B, 2A and 2B.
Figure 5B:
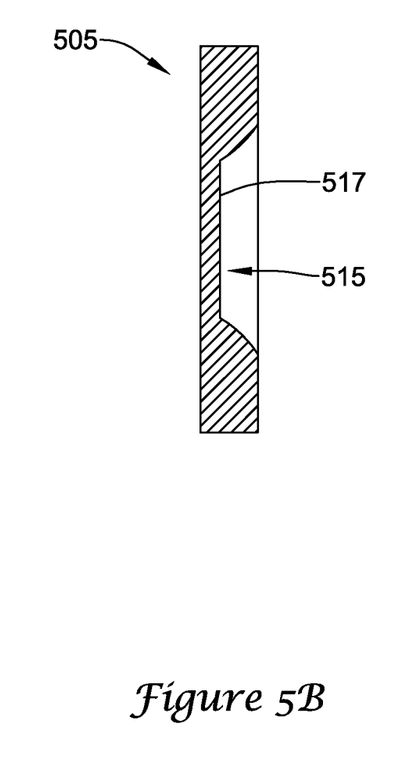
FIG. 5B is a cross-sectional view of the illustrative sense die of FIG. 5A.

FIG. 5A is a schematic top-side view of an illustrative sense die 500 that may be used with the illustrative force sensors 100/200 of FIGS. 1A, 1B, 2A and 2B. Illustrative sense die 500 may represent sense die 130 of FIG. 1A. FIG. 5B is a cross-sectional view of the illustrative sense die 500 of FIG. 5A. In some embodiments, the sense die 500 may include a diaphragm 517 having a number of force sensing elements, such as piezoresistive sensing elements, for sensing a deflection of the diaphragm 517 caused by an applied force. In some cases, the diaphragm 517 may be formed by etching out a cavity 515 into the substrate of the sense die 500 (see FIG. 5B).

As shown in FIG. 5A, the sense die 500 may include a circuit area generally shown at 505, adjacent or outside of the diaphragm 517 on the top surface of the sense die 500 (here, "top surface" is referring to the left side of the sense die 500 in FIG. 5B). In some cases, one or more electrical components, such as electrical components 520, may be located within the circuit area 505. This may include one or more trimmable resistors and/or other adjustable components, as further described below with respect to FIG. 5C.

The sense die 500 may include electrically conductive pads 530, 535, 540 and 545 on the top surface of the sense die 500, which may be configured to transmit electrical signals and/or provide power/ground to/from the sense die 500. For example, the electrically conductive paths may include a power supply connection (e.g., Vs 530 and GND 535) and one or more signal paths (e.g., $V_{O+}$ 540 or $V_{O-}$ 545). Although not shown, the sense die 500 may include electrical traces on the surface of the sense die 500 or within the substrate that provide electrical connections between the various electrically conductive pads 530, 535, 540, 545, the one or more electrical components in the circuit area 505, and/or the force sensing elements. In one example, traces may be used to form electrical connections between the conductive pads $V_{O+}$ 540 or $V_{O-}$ 545 and the force sensing elements for forming a Wheatstone Bridge. In some cases, the traces may be incorporated into the substrate (e.g., p-type doping on an n-type substrate, or an n-type doping of a p-type substrate) and/or may include metal leads on the surface of the substrate, or any suitable material may be used, such as conductive polymers.

Temperature dependent effects of the sense die 517 can be compensated, for example, by using a temperature compensation circuit, which may include electrical components 520.

Temperature compensation can be used to provide an output signal (e.g., the differential voltage between $V_{O+}$ 540 and $V_{O-}$ 545) that is substantially improved over a specified temperature range (e.g., between about 0° C. to about 50° C.). For example, an uncompensated force sensor may have a sensitivity that changes by about 20% over a 100° C., whereas a temperature compensated force sensor may have a sensitivity that changes by only about 2% or less over the same temperature range (e.g., e.g., between about 0° C. to about 50° C.). In some examples, temperature compensation may be accomplished using one or more passive electronic components (e.g., resistors) as further described below with respect to FIG. 5C. However, it is contemplated that the temperature compensation circuit may include other electrical components 521 such as diodes, thermistors, transistors, etc., if desired. The compensation components may be arranged adjacent to the diaphragm 517 and may be connected to the force sensing elements 512.

Figure 5C:
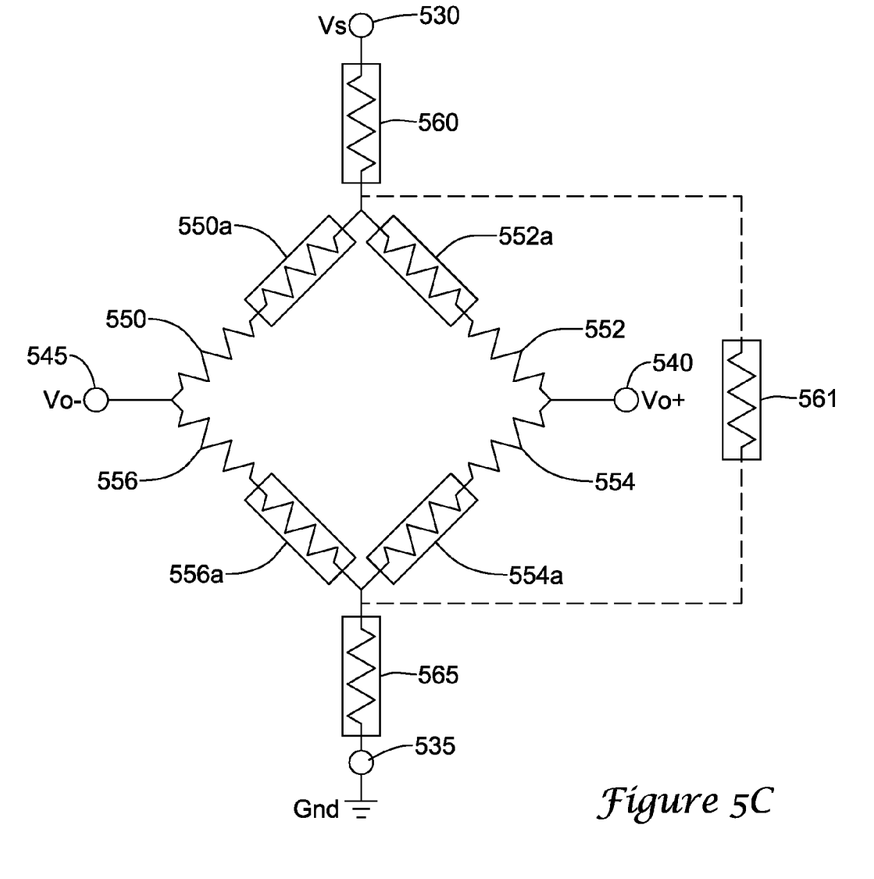
FIG. 5C is schematic diagram of illustrative force sensing elements and a temperature compensation circuit for the sense die of FIG. 5A.

FIG. 5C is schematic diagram of illustrative force sensing elements and a temperature compensation circuit for the sense die 500 of FIG. 5A. In the example shown, the force sensing elements may include piezoresistive sensing elements 550, 552, 554, 556 connected in a Wheatstone bridge configuration. The piezoresistive sensing elements 550, 552, 554, 556 may be arranged in a full bridge configuration as shown, in a half-bridge configuration, or any other suitable configuration as desired. A temperature compensation circuit may include the one or more electrical components, such as electrical components 520. In FIG. 5C, the temperature compensation circuit includes trimmable resistors 560 and 565 arranged in series with the power Vs 530 and GND 535 of the bridge, respectively. While the trimmable resistor 560 is shown in series with the Vs 530 connection, and the trimmable resistor 565 is shown in series with the GND 535 connection, other configurations are contemplated (e.g., only one resistor 560, only one resistor 565, etc.).

In some cases, the value of the compensation components (e.g., trimmable resistors 560 and/or 565) may be determined through an experimental process during production or may be determined through a mathematical equation. For example, the trimmable resistor 560 and/or the trimmable resistor 565 may be adjustable by laser trimming, diode zapping, fuse blowing and/or through any other suitable process. Laser trimming may be used to trim the size of each of the trimmable resistors 560 and 562. Alternatively, a number of diode-connected transistors may be connected in parallel to various trimmable resistors 560, 565. That is, each trimmable resistor 560, 565 may have two or more resistors connected in series, and one or more diode connected transistors in parallel with each of the resistors. By shorting a diode-connected transistor, which may be in parallel to a particularly trim resister, the trim resistor may be shorted out and may effectively be removed. Through this technique, a resistance of the corresponding leg of trimmable resistors 560, 565 may be reduced or otherwise modified. In some cases, such diode shorting or zapping may be accomplished through use of external contact pads. For example, external contact pads (not shown) may provide contacts for zapping or shorting one or more diode connected transistors to remove (i.e., short out) a trim resistor. That is, by applying an appropriate voltage across the external contact pads, the appropriate diode connected transistor may be shorted out, thereby removing a selected trim resistor from a trimmable resistor 560, 565.

In some examples, the compensation components may be connected to the force sensing elements to help compensate for a temperature related characteristic of the sense die 500, which may cause a non-linear temperature effect on the output signals (e.g., $V_{O+}$ 540 and/or $V_{O-}$ 545) of the force sensor 100/200. When the compensation components are trimmable resistors 560, 565, the trimmable resistors 560, 565 may be laser trimmed or otherwise adjusted to perform some level of temperature compensation to the output signals of the force sensor 100/200.

In FIG. 5C, and during operation, when a current is applied to the piezoresistive sensing elements 550, 552, 554, 556, an electrical output signal is generated that is related to the degree of deflection of the diaphragm 517, and thus to the force applied to the force sensor 100/200. The actuating element 150 may be configured to transmit the external force to the diaphragm 517, which then deflects the diaphragm 517 accordingly and changes the resistance of the piezoresistive sensing elements 550, 552, 554, 556. Typically, piezoresistive sensing elements 550 and 554 are placed in a compressive region of the diaphragm 517, and piezoresistive sensing elements 552 and 556 are placed in a tensile region of the diaphragm 517, or visa-versa. In this configuration, twice the output signal may be generated by the Wheatstone bridge.

In some cases, each of the piezoresistive sensing elements 550, 552, 554, 556 may have a corresponding trimmable resistor 550a, 552a, 554a and 556a connected in series as shown, but this is not required. When provided, trimmable resistor 550a, 552a, 554a and 556a may be trimmed to help balance the bridge and perform some level of temperature compensation to the output of the force sensor 100/200. In some cases, a trimmable resistor 561 may be connected in parallel with the Wheatstone bridge as shown. When provided, trimmable resistor 561 may be trimmed to perform some level of temperature compensation to the span of the force sensor 100/200. In some instances, trimmable resistors (not shown) may be connected between each of the output signals $V_{O+}$ 540 and $V_{O-}$ 545 and VS and/or GND of the Wheatstone bridge. When provided, such trimmable resistors may be trimmed to perform some level of temperature compensation to the offset of the force sensor 100/200. These resistor configurations are only meant to be illustrative, and it is contemplated that the temperature compensation circuit may include any suitable circuit configuration to provide some level temperature compensation to the force sensor 100/200.

While an ideal force sensor may provide an output signal having a linear relationship between the applied force and the resulting electrical signal output from the sensor, real-world examples may include one or more non-linear characteristics that may affect the sensor output signal. For example, a force sensor may detect a change in force over an area using a force sensing element to convert the applied force into a stress and/or displacement proportional to the applied force. Sensitivity of a force sensor may be defined as the slope (e.g., gradient) of the output voltage (e.g., the differential voltage between $V_{O+}$ 540 and $V_{O-}$ 545) to the applied pressure, where the sensitivity may be scaled by the applied voltage (e.g., Vs 530). When piezoresistive elements are used, temperature may cause a change to the piezoresistive characteristic of the substrate material (e.g., silicon), which may then cause a change in an electrical characteristic of the piezoresistive sensing elements 550, 552, 554, 556. For example, the piezoresistive coefficient of a material may decrease as the temperature increases, which in turn may cause the sensitivity of the force sensor to change as the temperature increases. In another example, a bridge offset voltage may be present (e.g., a non-zero output value when no force is applied to the sensor) and may be caused by a bridge imbalance and/or thermally introduced package stress effects.

Having thus described several illustrative embodiments of the present disclosure, those of skill in the art will readily appreciate that yet other embodiments may be made and used within the scope of the claims hereto attached. It will be understood that this disclosure is, in many respects, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A force sensor comprising:
   a housing having a cavity and a plurality of terminals, the plurality of terminals including a power supply terminal, a ground terminal, and at least one signal terminal;
   a sense die located within the cavity of the housing, the sense die having:
      a diaphragm with at least two piezoresistive sensing elements for sensing a deflection of the diaphragm;
      a temperature compensation circuit in electrical communication with at least one of the at least two piezoresistive sensing elements;
      a number of pads including a power supply pad, a ground pad and at least one signal pad;
   an actuating element operably coupled to the diaphragm of the sense die, the actuating element configured to transfer a force to the diaphragm in a contact area from a source external to the housing, wherein the force applied to the diaphragm of the sense die by the actuating element is substantially non-uniform across the diaphragm, wherein a center of the contact area is not precisely aligned with a center of the diaphragm; and
   an elastomeric seal positioned between the sense die and the housing, the elastomeric seal having at least two conductive regions separated by an insulating elastomeric material, wherein the at least two conductive regions are spaced from an outer peripheral edge of the elastomeric seal, at least one of the conductive regions connecting the power supply pad of the sense die with the power supply terminal of the housing, and at least another one of the conductive regions connecting the ground pad of the sense die with the ground terminal of the housing.

2. The force sensor of claim 1, wherein the temperature compensation circuit includes at least one trimmable resistor between the power supply pad of the sense die and at least one of the piezoresistive sensing elements and at least another trimmable resistor between the ground pad of the sense die and at least one of the piezoresistive sensing elements.

3. The force sensor of claim 1, wherein the temperature compensation circuit includes at least one trimmable resistor that is in series with at least one of the piezoresistive sensing elements.

4. The force sensor of claim 1, wherein the temperature compensation circuit includes at least one trimmable resistor that is in parallel with at least one of the piezoresistive sensing elements.

5. The force sensor of claim 1, wherein at least another one of the conductive regions connecting one of the at least one signal pad of the sense die with one of the at least one signal terminals of the housing.

6. The force sensor of claim 1, wherein the housing includes a base and a cover, wherein the base and cover collectively define the cavity that houses the sense die.

7. The force sensor of claim 6, wherein the cover includes an opening, wherein the actuating element extends from the diaphragm of the sense die and through the opening in the cover.

8. The force sensor of claim 1, wherein the plurality of terminals of the housing are surface mount technology (SMT) terminals.

9. The force sensor of claim 1, wherein the actuating element is spherically shaped.

10. The force sensor of claim 1, wherein the actuating element has a first end that engages the diaphragm of the sense die, wherein the first end is semi-spherical in shape.

11. The force sensor of claim 1, wherein the actuating element has a first end that engages the diaphragm of the sense die, wherein the first end is curved in shape.

12. The force sensor of claim 1, wherein the sense die includes a circuit section laterally spaced from the diaphragm of the sense die, wherein at least part of the temperature compensation circuit is located in the circuit section of the sense die.

13. The force sensor of claim 12, wherein the at least two conductive regions of the elastomeric seal are located near the corners of the elastomeric seal.

14. The force sensor of claim 1, wherein the at least two piezoresistive sensing elements are connected in a Wheatstone bridge configuration, and the temperature compensation circuit includes a first trimmable resistor in series with a first power input of the Wheatstone bridge and a second trimmable resistor in series with a second power input of the Wheatstone bridge.

15. The force sensor of claim 14, wherein at least one of the first resistor and the second resistor is trimmable.

16. The force sensor of claim 1, wherein the at least two conductive regions are spaced from all outer peripheral edges of the elastomeric seal.

17. A temperature compensated force sensor comprising:
a housing including one or more electrical connections;
a sense die having a first side and a second opposite side, the sense die defining a diaphragm with a center, the first side of the sense die supporting at least one force sensing element for sensing a force applied to the diaphragm, one or more electrical connecting pads, and a temperature compensation circuit that includes one or more trimmable resistors that are in electrical communication with one or more of the force sensing elements;
an actuating element movable along an axis of movement for transferring an external force to the diaphragm, wherein the axis of movement of the actuating element is not precisely aligned with the center of the diaphragm; and
an elastomeric seal having two or more conductive regions, wherein the conductive regions are configured to provide an electrical connection between the one or more electrical connecting pads of the sense die and the one or more electrical connections of the housing.

18. A force sensor comprising:
a housing having a surface mount technology (SMT) package including electrical connections;
a sense die housed by the housing, the sense die configured to sense a force and communicate at least partially temperature compensated information about the sensed force to one or more of the electrical connections of the housing;
a rigid actuator for transferring a force applied to the actuator to the sense die; and
an elastomeric seal having a top surface, a bottom surface and outer peripheral side walls extending between the top surface and the bottom surface, the elastomeric seal having conductive regions, with each of the conductive regions spaced inward from all outer peripheral side walls of the elastomeric seal and recessed from at least a portion of the top surface and the bottom surface of the elastomeric seal, at least one of the conductive regions communicating the information about the sensed applied force to at least one electrical connection of the housing.

19. The force sensor of claim 18, wherein the sense die includes a temperature compensation circuit that includes at least one configurable element.

20. The force sensor of claim 19, wherein the at least one configurable element is one or more of a fuse and a trimmable resistor.

* * * * *